United States Patent [19]

Adelman et al.

[11] Patent Number: 4,505,309

[45] Date of Patent: Mar. 19, 1985

[54] TIRE INFLATION

[75] Inventors: Robert W. Adelman; Daniel W. Blevins, both of Wilmington, Del.

[73] Assignee: The Crowell Corporation, Newport, Del.

[21] Appl. No.: 514,533

[22] Filed: Jul. 18, 1983

Related U.S. Application Data

[63] Continuation of Ser. No. 287,556, Jul. 28, 1981, abandoned, which is a continuation-in-part of Ser. No. 264,196, May 15, 1981, Pat. No. 4,410,021.

[51] Int. Cl.³ .............................................. B65B 3/04
[52] U.S. Cl. ..................................... 141/97; 141/114; 157/1
[58] Field of Search ................... 141/1, 10, 38, 67, 68, 141/83, 94–98, 114, 313–317, 382, 65, 66; 49/68; 137/223, 227; 152/415; 70/1; 157/1

[56] References Cited

U.S. PATENT DOCUMENTS

| | | | |
|---|---|---|---|
| 870,103 | 11/1907 | Higginson | 141/97 |
| 2,407,049 | 9/1946 | Winarsky et al. | 157/1 |
| 2,571,302 | 10/1951 | Smith | 141/97 |
| 3,495,647 | 2/1970 | Branick | 157/1 |
| 3,817,299 | 6/1974 | Koeler | 141/97 |
| 3,820,435 | 6/1974 | Rogers | 73/35 |
| 3,894,421 | 7/1975 | Sperberg | 141/4 |
| 4,036,274 | 7/1977 | Peel, Sr. | 157/1 |
| 4,248,342 | 2/1981 | King | 206/3 |
| 4,281,692 | 8/1981 | Caccamisi | 141/95 |
| 4,291,500 | 9/1981 | Reckin et al. | 49/68 |

FOREIGN PATENT DOCUMENTS 1605618 1/1970 Fed. Rep. of Germany .
2861 of 1897 United Kingdom .

OTHER PUBLICATIONS

"Metro", Evening Sun, Sep. 22, 1982.

Primary Examiner—Houston S. Bell, Jr.
Attorney, Agent, or Firm—Connolly and Hutz

[57] ABSTRACT

Vehicular tires, mounted on wheel rims, are more safely inflated in rugged box enclosing entire tire-and-wheel-rim assembly, using inflating line that penetrates through wall of box, with pressure gauge visible from outside of box. Interlocks can be provided to help assure that box must be closed before inflation can be started, and that box cannot be opened for 5 to 10 minutes after inflation is completed. Window can be provided for visually inspecting tire-and-wheel-rim assembly during or after inflation, and deflation valve permits deflation if the inflation appears unsafe.

5 Claims, 6 Drawing Figures

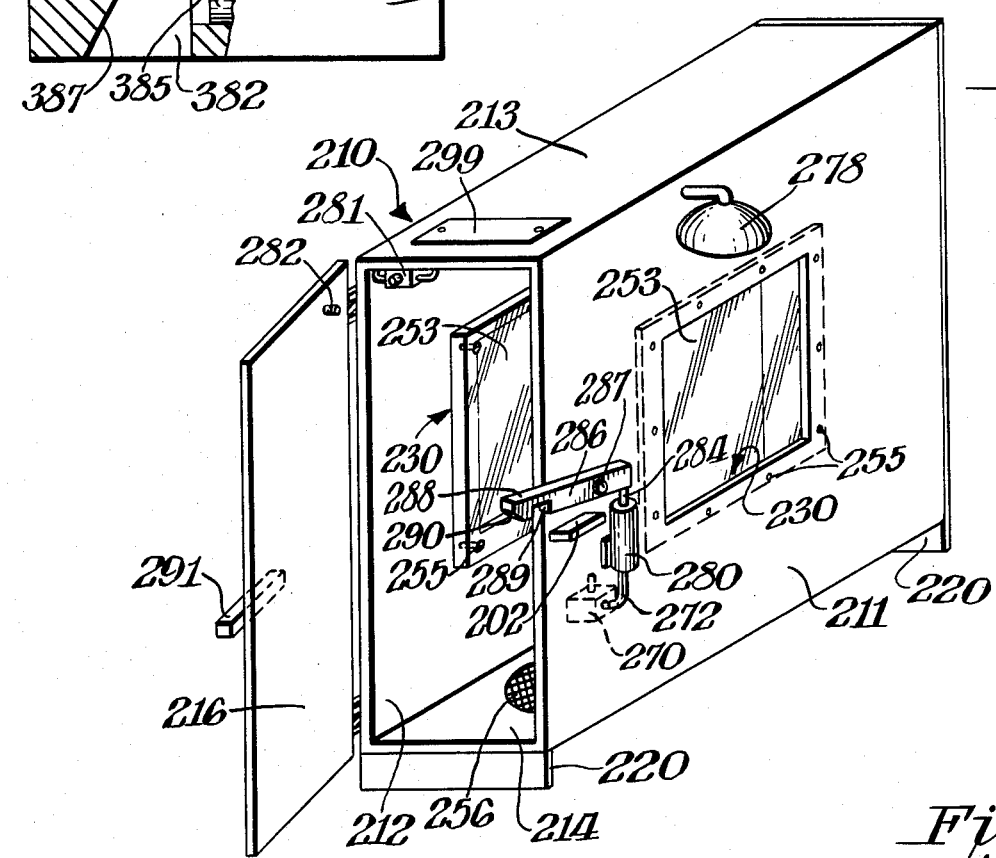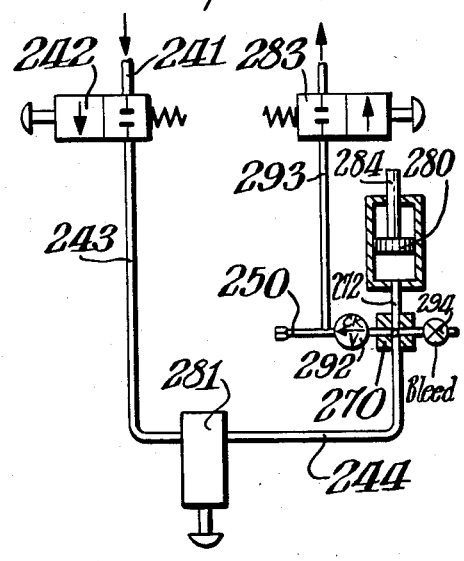

TIRE INFLATION

This application is a continuation of application Ser. No. 287,556 filed July 28, 1981, now abandoned, which is in turn a continuation-in-part of application Ser. No. 264,196 filed May 15, 1981, now U.S. Pat. No. 4,410,021.

The present invention relates to the inflation of vehicular tires, more particularly to the inflation of tires that can cause considerable damage when something goes wrong.

Among the objects of the present invention is the provision of novel apparatus for relatively safe inflation of tires.

Additional objects of the present invention include novel techniques for relatively safely inflating tires while they are mounted on wheel rims that may have un-noticed defects.

The foregoing as well as still further objects of the present invention will be more fully explained in the following description of several of its exemplifications, reference being made to the accompanying drawings, wherein:

FIGS. 2 and 3 are similar views of modified constructions typical of the present invention;

FIG. 4 is a schematic representation of an air-supply circuit particularly suited for the present invention;

FIG. 5 is a detail view partly in section of a further modified construction of the present invention; and FIG. 6 is a sectional view of an inflation actuating control desirable for use with the present invention.

According to the present invention, an apparatus for relatively safely inflating pneumatic tires on vehicular wheel rims, comprises a box that receives a tire-carrying wheel rim, the box having walls surrounding all sides, top and bottom of the tire-carrying wheel rim, the walls being sufficiently strong and securely held to contain all tire and wheel parts in the event the tire explodes, one wall of the box being openable to permit the introduction and the removal of the tire-carrying wheel rim, a flexible air conduit within the box having an outlet connector that can be clamped to a tire valve stem, the air conduit having linking means penetrating through a wall of the box to a valved supply line outside the box, and a pressure indicator visible from outside the box and connected to the flexible air conduit to indicate the pressure in the tire.

The box is conveniently made of ¼ inch thick steel plates welded together, although thicker plates can also be used. It is also helpful for the box not to be airtight but to contain leak gaps that permit the harmless escape of air from the box, in the event a tire in the box explodes. A total leakage through at least about 20 square inches effective leak cross-section is preferred.

Figure 1:
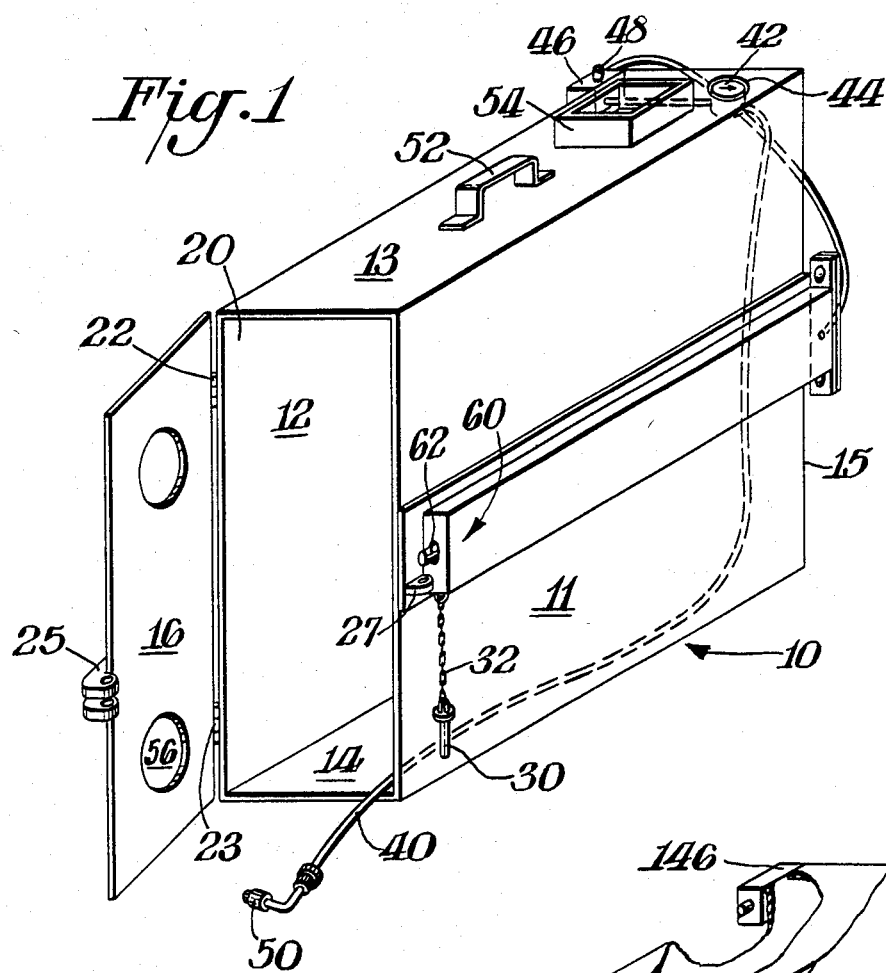
FIG. 1 is an isometric view of an inflating apparatus representative of the present invention.

Turning now to the drawings, FIG. 1 shows a box 10 made of steel plates 11, 12, 13, 14, 15 and 16, each about ¼ inch thick. Side plates 11, 12 are welded to top and bottom plates 13, 14, and to a rear plate 15 to form an open box large enough to receive a wheel-rim-mounted truck tire. The interior of this box can be 4 feet high, 4 feet deep and about 14 inches wide, so that most truck tires can be easily rolled in through its open mouth 20. Truck tires are the type of tire most likely to explode, as for example because of an unnoticed crack or failure of the wheel rim on which they are being inflated. Improper mounting of the tire on the rim can also lead to such explosions.

Mouth 20 can then be closed by door plate 16, which is shown pivotally mounted on hinges 22, 23 securely fitted to plate 16 and to side plate 12. The door plate also carries a forked pair of rings 25 that become aligned with a pintle ring 27 welded to plate 11, when the door is closed. The door can then be locked in closed position by inserting a pintle pin 30 downwardly through the aligned rings. Pin 30 is shown as carried by a chain 32 anchored to plate 11, so that it does not get lost.

Within box 10 is a flexible compressed air conduit 40 of the type used to inflate tires. This conduit leads to a pressure gauge 42 mounted against the inner surface of plate 15 but having its face exposed through an opening 44 cut in plate 13. The pressure gauge leads in turn to a control valve 46, by means of a short length of pipe, not shown, that penetrates through a hole in plate 12. A compressed air supply line runs from valve 46 to a compressor or other source of compressed air, and a control button 48 is shown on control valve 46 to turn on and off the flow of compressed air to conduit 40. That conduit can be fitted with a clamp-on fitting 50 that removably clamps onto a tire valve stem to make an air-tight connection to the interior of the tire.

Box 10 is also shown as having a lifting strap 52 welded to the top of plate 13 so that the box can be conveniently lifted and lowered to move it to any desired location. Also an open container 54 can be secured to plate 13 or any of the adjoining plates 11, 12 or 15, to hold tire lubricant, or spare fittings or the like, that may be helpful for use when mounting or inflating a tire.

Air conduit 40 can desirably be made relatively short in length, so that it does not have a long projection that must be stuffed into the box with a tire and wheel assembly, and there is accordingly less danger of the conduit becoming pinched or kinked. Also a short conduit projection makes it easier to first roll a wheel and tire assembly part way into the box, then clamp the conduit to the tire valve stem, and finally roll the wheel and tire assembly with the conduit attached, all the way into the box. The door panel can then be closed, pinned, and the tire inflated.

In addition it becomes difficult or impossible to mount a short conduit 40 onto a tire valve stem unless the tire is partly rolled into the box.

Door panel 16 need not be closely fitted with respect to the mouth of the box. A gap of 1/16 inch all around that panel is actually helpful in that it permits the harmless escape of compressed air in the event a tire bursts while in the box. One or more openings 56 can also or alternatively be provided in the cover panel to permit further air escape, if desired.

Some tire explosions have been reported as taking place several minutes after completing inflation. It is accordingly desirable to wait five to ten minutes after completing an inflation, before opening the door panel and removing the inflated tire. To assure such a delay, the box can be equipped with an automatic lock that prevents premature opening.

In FIG. 1 a precautionary interlock assembly 60 is welded onto the exterior of side plate 11 and holds an interlock nose 62 above pintle ring 27 and in the path of pin 30 as it is inserted in or removed from pinning engagement with the rings 25 of the door panel. Nose 62 is carried by the piston of an air cylinder that extends through the interior of the interlock assembly to the rear panel 15 where it is connected to receive air from the compressed air supply when valve 46 is actuated. Upon such actuation the air cylinder will force nose 62 into the blocking position shown, and thus keep a previously inserted pin from being withdrawn.

Valve 46 can be of the type that when it shuts off the delivery of compressed air it automatically bleeds out to the atmosphere the air downstream of the valve. In the FIG. 1 construction valve 46 has two branched downstream lines, one to conduit 40 and the other to precautionary interlock 60. The branch to conduit 40 is fitted with a check valve to prevent the automatic bleeding, but the line to the interlock assembly is permitted to bleed. The bleeding rate is fixed at a value that requires 5 to 10 or more minutes before the interlock cylinder air pressure is low enough to allow nose 62 to be withdrawn or pushed away from pin-blocking position. The pin 30 can then be removed, the door panel opened, and the inflated tire rolled out of the box.

Figure 2:
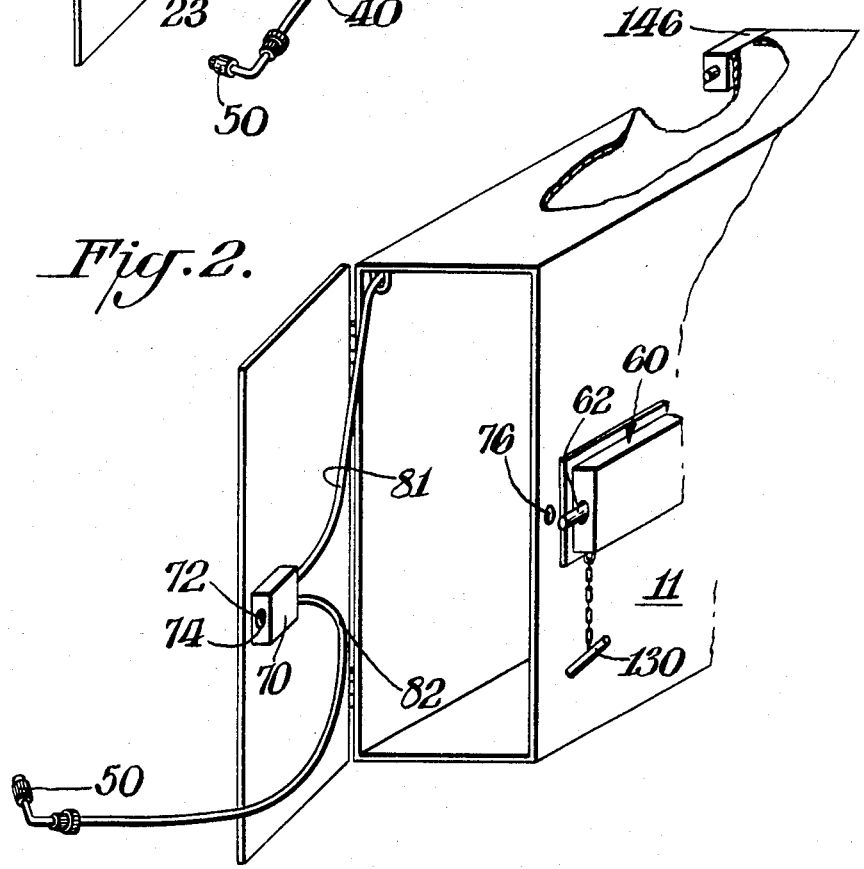

FIG. 2 shows a modified construction in which the interlock also helps assure that the door panel must be closed before inflation can be effected. Here an auxiliary control valve 70 has an actuating button 72 deeply recessed in the interior of guide passageway 74, and located on the door panel so that closing of that panel brings passageway 74 into alignment with a pin-receiving aperture 76 in side panel 11.

Valve 70 has two air lines 81, 82, one going to a main control valve 146 and the other to valve stem clamp 50. When the door panel is closed, interlock nose 62 can be pushed in and pin 130 then inserted through aperture 76 and guide passageway 74. Control button 72 can be strongly spring loaded so that considerable force is needed to cause pin 130 to actuate the valve. Nose 62 can then be pulled out to hold pin 130 in actuating position. Inflation can now be effected, after which the nose 62 can be again pushed out of the way once the time-delayed bleeding is completed.

The air cylinder in interlock 60 can be replaced by a rubber bladder that is inflated by the compressed air and presses against a loosely fitted vertically positioned internal plate on which nose 62 is mounted. The bleed opening need only be about a 5 mil wide hole, when the total volume of air to be bled is about 2 liters. Preferably a wire is inserted through the bleed hole and loosely held there so that it can jiggle and keep the hole from becoming clogged with dust or the like.

Holes 56 can be cut through the bottom plate 14, instead of the door plate, in which event it is helpful to have the box floor a little above the ground, as by welding skid strips or short feet to the outside of the box. Such holes can be covered with heavy wire mesh to keep conduit 40 from getting trapped in them.

In FIG. 2 the main control valve 146 has its actuating button positioned on a vertical face, so that the button is pushed in a horizontal direction to trigger the inflation. This makes it difficult to defeat the need to manually operate the valve, an undesirable technique that could be effected as by placing a weight on its actuating button to hold it down. If desired that button can be located on the under surface of the control valve.

The precautionary interlock can be provided in other ways. Thus electrical micro-switches can be mounted on the door panel of the construction of FIG. 2, one to be actuated when the door panel is closed and another when the pin 130 is moved into door-locking position. These switches can be wired in series with each other and in series with a main electrical switch that starts a compressor which furnishes the compressed air to flexible line 40. That main switch can be located at 146 and can also be separately connected to a solenoid that brings interlock nose 62 into locking position and latches it in that position. A timer is also started when the main switch is disengaged and the timing out of the timer unlatches the solenoid.

Alternatively, the flexible air conduit 40 can include a make-and-break push-pull connector consisting of two separable parts one of which is mounted on the door panel and the other of which is mounted on the outside of panel 11. When the door panel is closed it carries its part of the connector into engagement with the part on panel 11, and in this way establishes the compressed air path to a portion of air conduit 40 that extends through an opening in the door panel and into the interior of the box.

Opening the door panel, then opens the make-and-break connection so that no compressed air can reach the tire valve. The parts of the make-and-break connector can also be arranged to lock together when their interiors are subjected to super-atmospheric pressure, to thus lock the door in closed position. This can be effected by making the make-and-break connection between a rubber male connector that expands when its interior is under pressure, and a relatively rigid female connector that receives the male connector and has a tapered internal bore that holds the male connector in place when the male connector is expanded.

A bleed hole can be used to bleed the pressurized air out of the make-and-break connector over the desired time period. A check valve downstream of the make-and-break connector prevents bleeding of the air from the inflated tire.

The boxes of the present invention can be larger or smaller than indicated in the dimensions given above, and can be made to fit any tire.

To prevent misoperation, filters can be installed in the air lines, particularly just upstream of an air cylinder, or upstream of the main valve, to trap dust and other particles and thus keep them from getting into critical places.

The construction of FIG. 3 has a box 210 similar to those of FIGS. 1 and 2, but with a viewing window 230 in each of the box's side panels 211, 212. Each window is cut out of its panel and covered with a transparent sheet 253 of a thick, tough plastic such as polycarbonate. The sheet is illustrated as mounted against the inner face of its panel, and held by flat head screws 255 recessed in the sheet and threaded directly into threaded openings in the panel. If desired one or both plastic sheets can be fitted to the exterior faces of their panels, in which event the sheets can be made thicker and can be fastened with more fasteners. These sheets are thick enough to withstand the force of a tire explosion that takes place inside the box, and a thickness of about $\frac{1}{2}$ inch or a little more is suitable for this purpose.

Box 210 has vent openings 256 in its floor panel, but they can alternatively or additionally be in the top panel 213. These vent openings are spanned by spaced metal straps welded in place to make sure anything escaping through a vent is quite small in size, and also to prevent passing through the vent the air line used for inflating. This makes it more difficult to use that line for inflating a tire without fitting the tire inside the box.

The inflating line is not shown in FIG. 3, but is connected to one branch of a junction block 270 having another branch connected to the input line 272 of an air cylinder. A third branch of the junction block is connected by pipe or flexible tubing to an interlock valve 281 mounted in the mouth of the box for activation by a post or plunger 282 carried by door 216. Valve 281 is normally closed, but is opened when door 216 is closed, so that the air will not reach the junction block unless that door is closed.

The construction of FIG. 3 is also fitted with two more valves, one a normally closed main inflating valve connected between the intake of the interlock valve 281 and the compressed air supply, and the other connected to act as a discharge for deflating the tire. The inflating valve is placed as in FIGS. 1 or 2, sufficiently far from the interlock valve to make it impossible for one person to manually open both of these valves simultaneously.

The discharge valve is opened when a tire under inflation is to be deflated, such as when it is noticed through a window 230 that the tire and/or wheel rim has not been properly mounted or there is some defect or failure that renders the inflation unsafe. To help examine for such problems one or more electric lights 278 can be fitted above or around the outer face of each window, or inside the corners of the box.

The inflating, deflating and interlock valves can be of identical construction, such as Schrader poppet valve 7796SP5 shown in Schrader Fluid Power Division Catalog VAL-1 (Rev. 10/76).

Air cylinder 280 is secured to the outer face of panel 211 to hold a piston rod 284 up against the bottom of one end of a latch lever 286. That lever is pivoted on a pin 287 secured to panel 211, so that the opposite end 288 of the latch lever projects forwardly beyond the open mouth of the box. That projecting end has a locking notch 289 in its lower portion, and also has a latching nose cam 290. These coact with a latch bar 291 welded to the door 216. When that door is being closed with the air cylinder not inflated, the bar 291 first engages the nose cam 290 to thus tilt up the latch lever end 288. Further closing movement brings bar 291 under locking notch 289 permitting the latch lever end 288 to drop over the bar and lock the door in closed position.

The closing of the door automatically opens interlock valve 281, and the actuation of the inflating valve then inflates the tire and wheel previously inserted into the box as described in connection with FIG. 1. Such inflation also inflates air cylinder 280 forcing rod 284 up against the rear of latch lever 286 securely holding it in door-locking position. A rest or stop bar 202 can be provided to keep the latch lever 286 from tilting down below latching position.

A preferred air line system is shown in FIG. 4. The compressed air supply runs from intake 241 of inflating valve 242 through that valve, then through connector 243, through interlock valve 281 and connector 244 to air cylinder 280. A check valve 292 branches from connector 244 and in turn connects to tire connector 250. Deflating valve 283 has its intake 293 opening into tire connector 250. A bleed 294 opens into connector 244 to gradually bleed out compressed air from cylinder 280 when inflation is completed. Check valve 292 is polarized to confine such bleeding to its air cylinder side, and the bleeding is adjusted, as pointed out above, to keep the latch lever in door-locking position for 5 to 10 minutes or more, before the pressure in the air cylinder drops to a level that permits unlocking of the latch lever. As little as ¼ minute or even 4 minutes delay is helpful in reducing the possibility of injury from delayed tire bursting.

It will be noted that when deflating valve 283 is actuated to deflate an inflated or partially inflated tire, the air cylinder is also deflated so that the deflated tire can be immediately removed from the box without waiting the length of time required for the slow bleeding. A restriction can be inserted in the line through which the cylinder thus deflates, or can be built into check valve 292, to help assure that the cylinder deflation is not completed much before the tire deflation.

If desired a normally open manually-operated shut-off valve can be inserted in the connection between bleed 294 and junction box 270, and its operator can be ganged with the operator of inflating valve 242, so that when the inflating valve is opened to inflate a tire, the bleed passageway is closed and no bleeding takes place. This speeds the tire inflation step.

Valves 242 and 283 can be solenoid-operated if desired, in which event valve 281 can be replaced by an electric circuit interlock switch, and connecting lines 243, 244 permanently open to each other. Such an interlock switch can be normally open but connected to switch to circuit-closing position and thus automatically actuate the inflating valve when door 216 is closed, and can be so heavily spring-biased toward open-circuit position that it takes the mechanical leverage provided by door 216 to switch it to circuit-closing position. When valve 281 is used it can similarly be heavily biased to closed position.

The use of electrical valve operation requires an electric power supply line in addition to an air supply line, but so does the use of lights 278. In addition an electric supply circuit can be readily fitted with a relay-operated warning light or alarm located at a supervisor's station, to show that the inspection lights 278 are not operating or that no electric power is being consumed. This will help guard against misoperating the apparatus.

The construction of FIG. 3 also has feet 220 holding the bottom panel 214 of the box a little above the floor on which the box stands. Rear foot 220 can merely be an extension of the rear panel of the box, and front foot 220 can be a narrow length of plate welded to the bottom panel 214.

FIG. 5 is a view from below of a box similar to those of FIGS. 1, 2 and 3, partly sectioned to show a modified construction for inspection windows 350. This window construction has a plate 353 of transparent plastic fitted across an opening 351 in box 310 as in the construction of FIG. 3. However, in FIG. 5 the plastic plate is re-enforced by a series of spaced bars 360 extending across the opening 351 and welded to the box, or to a metal frame 354, at both ends. In addition the bars 360 have their ends notched out so as to provide a longitudinal face 361 that engages the outer face of the plastic plate.

Bars 360 have horizontal widths that can be as much as an inch so as to provide rugged stiffening of the box as well as a tremendous support for the plate. The vertical depth of bar 360 can be as little as ¼ to ⅜ inch, and they can be spaced from each other by 1½ to 3 inches, so as to not interfere too much with visual inspection through the window. The re-enforcing bars 360 can be aligned so that they point toward any light or lights mounted on the exterior of the box and thus obstruct such lighting as little as possible.

Frame 354 can be used to support a plastic plate so that the inner surface 355 of the plate is flush with, or recessed outwardly with respect to, the inner face of the box panel in which the window is fitted. This reduces the scratching of plastic face 355 by the tire or wheel rim, or tire connector, and thus prolongs the life of a plastic plate. It is preferred to use tire connectors that project as little as possible toward the windows. Connectors numbered 5449K61 or 5449K62 described on page 1692 of McMaster-Carr Supply Company (New Brunswick, New Jersey) catalog 87 copyrighted 1981, are of this preferred type.

The inspection windows can be made circular or oval or of any other outline. Rectangular openings are simpler to fit with re-enforcing bars 360 inasmuch as all such bars for one window can then be made identical to each other.

FIG. 5 also shows an inflating valve 242 and a deflating valve 283 mounted on the box panel opposite door 216 and having their control buttons 302, 303 projecting downwardly so that they have to be pushed upwardly to be actuated. A pressure gauge 342 is also shown in FIG. 5 as connected in such a way that only a small perforation is needed in the box panel to receive the shank 343 of the pressure gauge. The entire face portion of the gauge is accordingly outside the box.

FIG. 6 illustrates a modified valve 380 built into a metal block 381 having a recess 382 in its lower face. The valve mechanism 383 is fitted to one end of the block and has an actuating button 384 in a bore 385 that opens into recess 382. Button 384 can be actuated by inserting one's finger into recess 382 and then bending the finger so that the fingertip engages button 384, after which the fingertip can be pushed against the button to move the button deeper in its bore. The wall 387 of recess 382 flares outwardly in a downward direction so as to make it difficult to wedge any member inside the recess for the purpose of attempting to hold the button 384 actuated without the use of one's hands.

The construction of FIG. 6 is particularly desirable if it is important to avoid tempting an operator to misuse the apparatus.

The apparatus of the present invention is also desirably fitted with a warning or record that contains instructions for its use. Thus a plate 299 can be mounted on its top panel for example as shown in FIG. 3, to carry a warning as to the maximum air pressure to be used, and also a place in which can be inscribed the number of tire explosions that the box can be expected to safely withstand. Space can be provided for scratching into the plate 299 a smaller number after each explosion it lives through, so that the box can be withdrawn from service after its safe life has been exhausted.

All fittings for the box are best protected against tampering; thus air cylinder 280 and its intake line 272 can be covered by a rugged metal shield welded to the outside of panel 211. A similar shield can be fitted around and over pressure gauge 342 to help assure that it is not removed for the purpose of using its connection as a source of compressed air.

Inflating and deflating valves 242, 243 can be combined into a single three-position valve. In one position the combined valve can then inflate both the tire and the air cylinder, while in another position both can be deflated. In a third position there is neither inflation or deflation. As noted above, a restrictor can be inserted in the deflation line from the air cylinder to make sure it does not become fully deflated much before the tire does. Alternatively a ballast tank can be connected to the air cylinder supply line to effectively increase the volume of air that must be deflated before the air cylinder permits unlatching of the door.

Such a three-way valve can be spring-biased toward the position in which there is no inflation or deflation, or it can be completely unbiased so as to remain in any position into which it is manually actuated.

The inflating and deflating control can be modified to use a standard quick-connect air supply connector as a control means. Such quick-connect connector is easily slipped into connecting engagement, and just as easily removed from connecting engagement. By having such engagement with a line that runs through a check valve to the air cylinder, and also with a branched line that runs through an on-off valve and through the door-interlock valve to the tire, no further mechanism is needed. Inflation is accomplished by attaching the air-supply connector which causes the air cylinder to become inflated, and actuating the on-off valve to on position to cause the tire also to be inflated. When the tire inflation is completed the on-off valve is returned to off position and the air-supply connector is removed. Such removal permits the air cylinder bleed to slowly deflate that cylinder, so that the inflated tire will not be prematurely removed from the protecting box. Also the tire can be deflated at any time after the air-supply connector is removed, by simply actuating the on-off valve to on position.

If desired the air-cylinder bleed can in the last-mentioned embodiment be built into the check valve, as by using a speed control valve of the type described on page 28 of the above-cited Schrader catalog. Such a valve has no actuator, permits full flow in one direction like an ordinary check valve, but only very limited flow in the opposite direction.

To reduce the danger of having one's finger caught under latch lever end 288 and abruptly pinched against latch bar 291, the air cylinder can be arranged to close the latch gradually. One simple way to accomplish this is to use a cylinder that has an exhaust outlet through which air is pushed out when the cylinder is being inflated, and sharply restricting the exhaust through that outlet.

Obviously many modifications and variations of the present invention are possible in the light of the above teachings. It is therefore to be understood that within the scope of the appended claims the invention may be practiced otherwise than as specifically described.

What is claimed:

1. A tire-inflating apparatus having an enclosure for receiving a tire-and-wheel-rim assembly to be inflated, said enclosure including a door movable between open and closed positions, compressed-air-actuated locking means fitted to the enclosure to lock the door in closed position when the door is closed and the locking means is actuated so that the received assembly cannot then be removed from the enclosure until the locking means is unlocked, compressed air means including an air conduit connected to supply compressed air to the tire of the assembly while the assembly is in the enclosure, and control means connected to actuate the compressed air means to inflate the tire and to also automatically actuate the locking means to lock the door in the closed position for a predetermined time beyond the inflation danger time, the control means being further connected to unlock the door after the expiration of said predetermined time.

2. The combination of claim 1 in which the predetermined time is about ¼ to 4 minutes.

3. The combination of claim 1 in which the locking means has an air-operated actuator that includes a small air bleed, and the compressed air means is connected to the air-operated actuator to actuate it when the control means is operated to cause tire inflation, the air bleed being connected to provide slow loss of compressed air from the air-operated actuator to thus unlock the locking means a predetermined time after the inflation is completed.

4. The apparatus of claim 1, wherein said control means includes electrical means.

5. The apparatus of claim 1, wherein said predetermined time exceeds five minutes.

* * * * *